United States Patent
Evans et al.

(10) Patent No.: US 7,828,518 B2
(45) Date of Patent: Nov. 9, 2010

(54) SECURING ARRANGEMENT

(75) Inventors: Dale E Evans, Derby (GB); Ben Williams, Derby (GB)

(73) Assignee: Rolls-Royce plc, London (GB)

( * ) Notice: Subject to any disclaimer, the term of this patent is extended or adjusted under 35 U.S.C. 154(b) by 127 days.

(21) Appl. No.: 12/222,206

(22) Filed: Aug. 5, 2008

(65) Prior Publication Data
US 2008/0292451 A1 Nov. 27, 2008

Related U.S. Application Data

(63) Continuation of application No. 11/363,039, filed on Feb. 28, 2006, now abandoned.

(30) Foreign Application Priority Data

Mar. 12, 2005 (GB) .................................. 0505147.9

(51) Int. Cl.
*F01D 9/00* (2006.01)
(52) U.S. Cl. ..................................................... 415/161
(58) Field of Classification Search ......... 416/160–166; 415/205, 207, 209; 403/315, 320; 411/192–195
See application file for complete search history.

(56) References Cited

U.S. PATENT DOCUMENTS

| 5,492,446 | A * | 2/1996 | Hawkins et al. | 415/160 |
| 6,439,616 | B1 * | 8/2002 | Karafillis et al. | 285/205 |
| 6,802,692 | B2 * | 10/2004 | Bouru | 415/160 |
| 6,976,816 | B2 * | 12/2005 | Slesinski et al. | 411/122 |

* cited by examiner

*Primary Examiner*—Ninh H Nguyen
(74) *Attorney, Agent, or Firm*—Jeffrey S. Melcher; Manelli Denison & Selter PLLC

(57) ABSTRACT

A securing arrangement 32 for securing an actuating lever 20 to a spindle 14, for example a spindle 14 of a variable inlet guide vane 10 in a gas turbine engine, comprises a fastening formation 38 rotatably co-operable, in use, with a corresponding fastening formation 30 on the spindle 14. The securing arrangement 32 is rotatable relative to the spindle 14 to a securing position in which the respective fastening formations 30, 38 co-operate so that the securing arrangement 32 secures the actuating lever 20 to the spindle 14. The securing arrangement 32 includes anti-rotation means 42, preferably in the form of anti-rotation tabs 44, for preventing rotation of the securing arrangement 32 from the securing position.

14 Claims, 3 Drawing Sheets

SECURING ARRANGEMENT

This application claims priority from British Application GB 0505147.9 filed Mar. 12, 2005, and this application is a continuation of U.S. application Ser. No. 11/363,039, filed Feb. 28, 2006 now abandoned.

The present invention relates to a securing arrangement for securing an actuating lever to a spindle, and particularly but not exclusively to a securing arrangement for securing an actuating lever to a spindle in a rotary component of a gas turbine engine.

Gas turbine engines conventionally include variable inlet guide vanes to control airflow through the engine, and these generally include a spindle to which an inlet guide vane actuating lever is secured by a securing arrangement.

It would be desirable to provide a securing arrangement which maintains the actuating lever secured to the spindle during engine operation and which is of simple construction.

According to a first aspect of the present invention, there is provided a securing arrangement for securing an actuating lever to a spindle, the securing arrangement comprising a fastening formation rotatably co-operable, in use, with a corresponding fastening formation on the spindle, and being rotatable relative to the spindle to a securing position in which the respective fastening formations co-operate so that the securing arrangement secures the actuating lever to the spindle, wherein the securing arrangement includes anti-rotation means for preventing rotation of the securing arrangement from the securing position.

The anti-rotation means may be co-operable, in use, with the actuating lever to prevent rotation of the securing arrangement from the securing position. The anti-rotation means may be arranged to abut the actuating lever, in use, to prevent rotation of the securing arrangement from the securing position. The anti-rotation means may be arranged to abut a side face of the actuating lever, in use, to prevent rotation of the securing arrangement from the securing position.

The anti-rotation means may extend generally radially from the securing arrangement, and may be axially deflectable from the radially extending position to permit rotation of the securing arrangement, in use, relative to the spindle.

The anti-rotation means may extend generally circumferentially around the securing arrangement.

The anti-rotation means may comprise an anti-rotation tab, and may comprise a plurality of anti-rotation tabs, each anti-rotation tab preferably extending generally radially from the securing arrangement.

The plurality of anti-rotation tabs may be arranged generally circumferentially around the securing arrangement. Adjacent anti-rotation tabs may be arranged to be generally in abutment with each other.

The securing arrangement may include a circumferentially extending flange portion, the anti-rotation means preferably being defined by the flange portion. The securing arrangement may include a fastening portion extending from the flange portion, the fastening formation preferably being provided on the fastening portion. The fastening portion may extend from the flange portion, preferably generally perpendicular thereto.

The fastening formation may comprise a threaded formation which may be co-operable, in use, with a corresponding threaded formation on the spindle.

The securing arrangement is preferably adapted to secure an actuating lever to a spindle in a rotary component of a gas turbine engine.

According to a second aspect of the present invention, there is provided a gas turbine engine incorporating a securing arrangement according to the first aspect of the present invention for securing an actuating lever to a spindle in a rotary component of the gas turbine engine.

An embodiment of the present invention will now be described by way of example only and with reference to the accompanying drawings, in which:—

Figure 1:
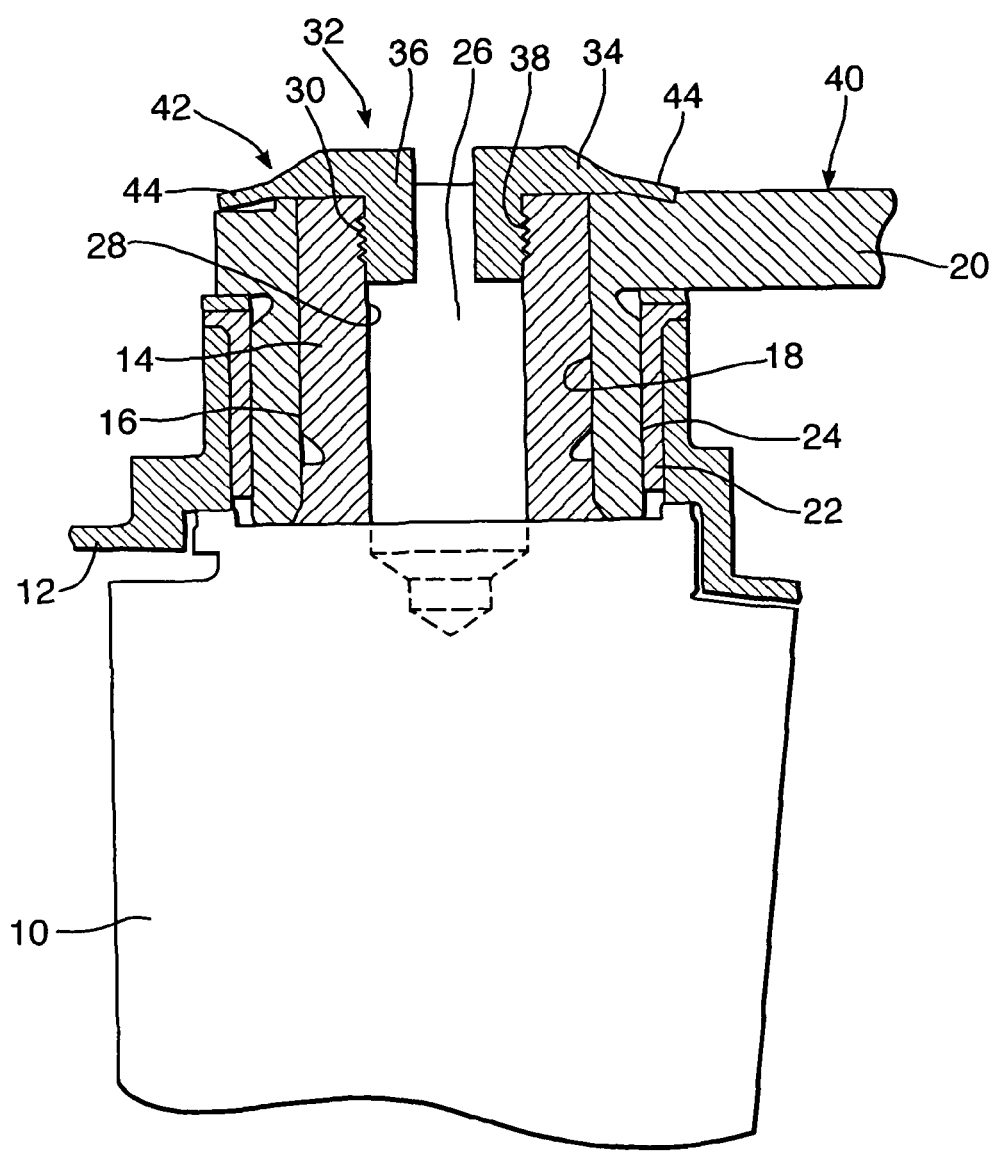
FIG. 1 is a diagrammatic cross-sectional side view of a securing arrangement according to a first embodiment of the present invention, in use.

Referring to FIG. 1, there is shown generally a variable inlet guide vane 10 for use in a rotary component, for example a compressor, of a gas turbine engine. The guide vane 10 is rotatably mounted in a casing 12 of the engine and includes a spindle 14 extending from an upper end thereof.

The circumferential outer surface 16 of the spindle 14 defines a plurality of splines (not shown) which are co-operable with corresponding splines defined by a circumferential inner surface 18 of an actuating lever 20, only part of which is illustrated in the drawings. The actuating lever 20 is operable, in use, to rotate the guide vane 10 to a desired position. A bush 22 is located between the casing 12 and a circumferential outer surface 24 of the actuating lever 20 and the actuating lever 20 is connected to an actuator ring (not shown), as is conventional in the art.

As best seen in FIG. 1, the spindle 14 is generally annular and defines a central passage 26. At least part of the circumferential inner surface 28 of the passage 26 defines a fastening formation 30 which, according to a preferred embodiment of the invention, is a threaded formation.

In order to secure the actuating lever 20 to the spindle 14 and prevent detachment of the actuating lever 20 from the spindle 14, for example during operation of the gas turbine engine, a securing arrangement 32, according to the present invention, is employed. The securing arrangement 32 generally includes a circumferentially extending flange portion 34 and a fastening portion 36 which is generally annular and which extends from the flange portion 34 generally perpendicular thereto. The fastening portion 36 is locatable, in use, in the passage 26 of the spindle 14 and includes a fastening formation 38, for example a threaded formation, which is rotatably co-operable with the fastening formation 30 on the spindle 14.

Figure 2:
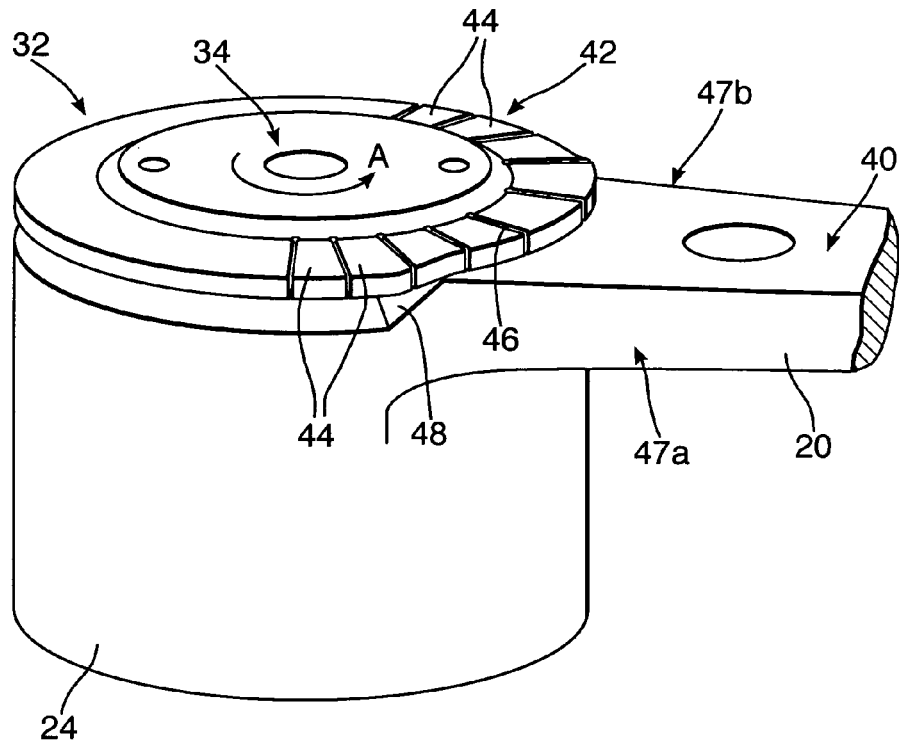
FIG. 2 is a diagrammatic perspective view of the securing arrangement and an actuating lever of FIG. 1.

As can be clearly seen in FIGS. 1 and 2, the flange portion 34 extends in use over an upper surface 40 of the actuating lever 20 such that when the securing arrangement 32 is rotated to a securing position in which the respective fastening formations 30, 38 co-operate such that a lower surface of the flange portion 34 of the securing arrangement 32 is firmly engaged with an upper end of the spindle 14, the securing arrangement 32 secures the actuating lever 20 to the spindle 14 and prevents unwanted or accidental release therefrom.

The securing arrangement 32 includes anti-rotation means, generally designated by the reference numeral 42, for preventing rotation of the securing arrangement 32 from the securing position, and thereby preventing unwanted or accidental release of the actuating lever 20 from the spindle 14.

Figure 3:
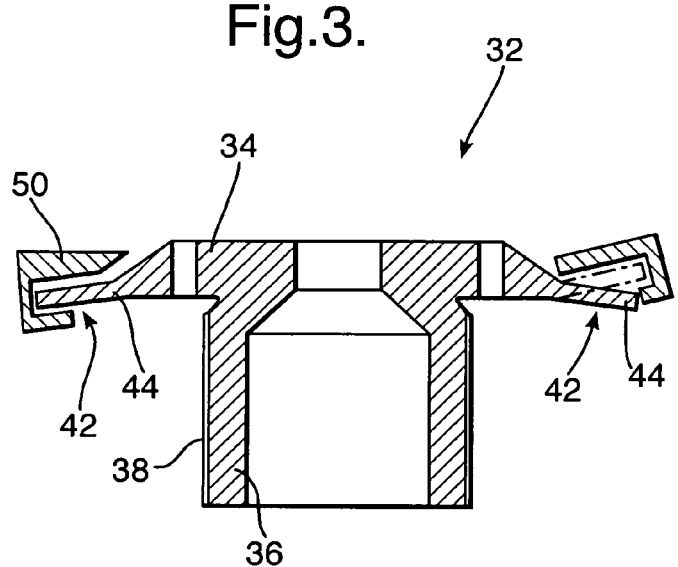
FIG. 3 is a diagrammatic cross-sectional side view of the securing arrangement of FIGS. 1 and 2.
Figure 4:
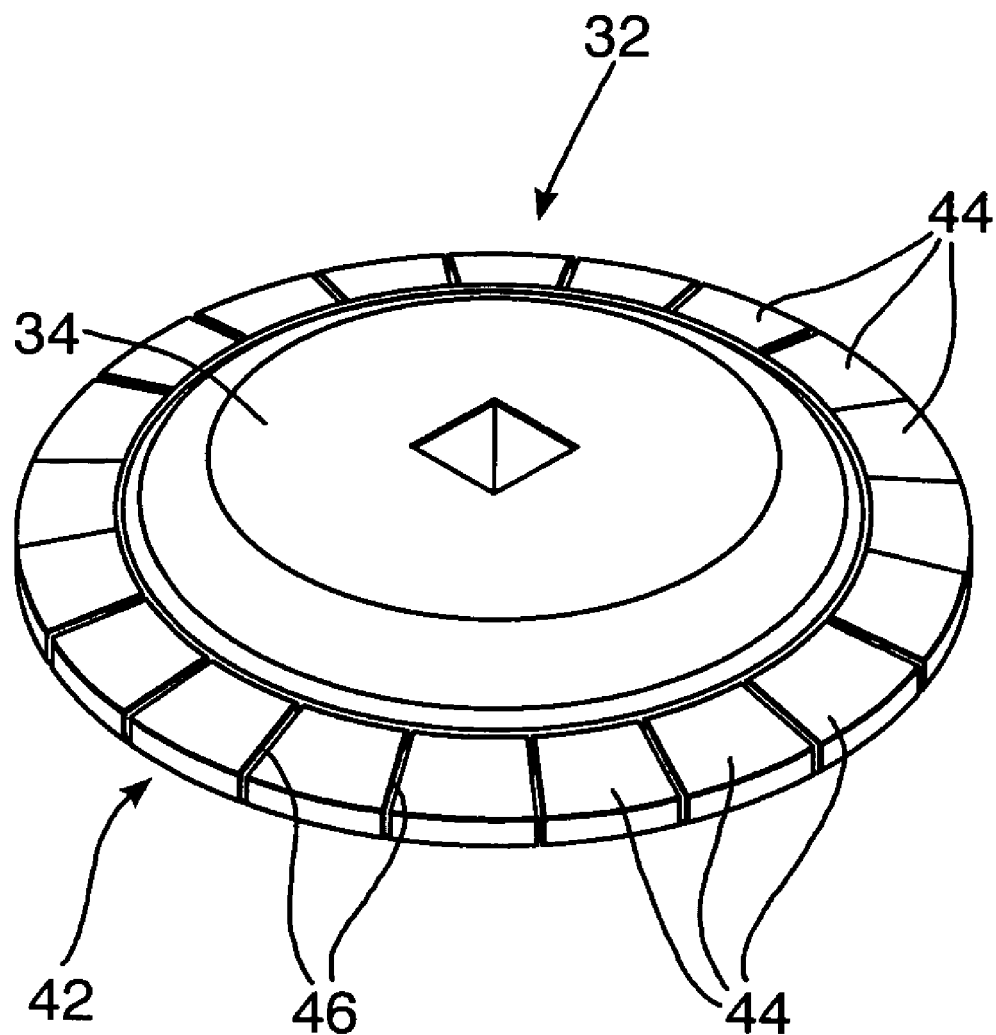
FIG. 4 is a diagrammatic perspective view of the securing arrangement of FIGS. 1 to 3.

In more detail, according to a preferred embodiment of invention, the anti-rotation means 42 comprises a plurality of anti-rotation tabs 44 (only some of which are shown in FIG. 2) arranged generally circumferentially around the securing arrangement 32. Each of the anti-rotation tabs 44 extends generally radially from the securing arrangement 32 and is defined by the flange portion 34. Each of the anti-rotation tabs 44 may slope gently downwardly in the direction of the fastening portion 36, as best seen in FIGS. 1 and 3.

The anti-rotation tabs 44 are arranged so that adjacent tabs 44 are generally in abutment but such that a small gap 46 is defined between adjacent tabs 44 to allow individual tabs 44 to be deflected upwardly without causing deflection of adjacent tabs 44. As best seen in FIG. 2, the size of the gap 46 is increased at the root of each of the anti-rotation tabs 44 to facilitate the deflection of individual tabs 44 and thereby prevent cracking and failure of the tabs 44 when deflected axially.

As best seen in FIG. 2, one side face 47a of the actuating lever 20 includes a sloping or chamfered portion 48 which merges smoothly into the upper surface 40 of the actuating lever 20. Accordingly, as the securing arrangement 32 is rotated in the direction of arrow A towards the securing position, the anti-rotation tabs 44 are deflected upwardly from their normal position so that they lie on the upper surface 40 of the actuating lever 20. This deflected position is shown in broken lines in FIG. 3.

As rotation of the securing arrangement 32 continues, the individual anti-rotation tabs 44 which have passed over the upper surface 40 of the actuating lever 20, and which are no longer in contact with the upper surface 40, spring back to their original position due to the inherent resilience of the material from which the securing arrangement 32 is fabricated. This could for example be a resilient metallic material or any other suitable material having sufficient resilience to enable the tabs 44 to be deflected and subsequently spring back to their original position.

When the securing arrangement 32 is rotated so that it is in the securing position, as shown in FIG. 2, the anti-rotation tab 44 which is adjacent to a side face 47b of the actuating lever 20 springs back to its original position and abuts the side face 47b. Unlike the side face 47a, the side face 47b does not include a sloping portion 48, and is instead a flat surface. This prevents the anti-rotation tabs 44 from being deflected upwardly towards the upper surface 40 of the actuating lever 20 if rotation of the securing arrangement 32 in the direction opposite to arrow A is attempted, and the abutment of the anti-rotation tab 44 adjacent to the side face 47b of the actuating lever 20 with the side face 47b thereby prevents rotation of the securing arrangement 32 from the securing position in the direction opposite to arrow A.

In the event of failure of the anti-rotation tab 44 which is in abutment with the side face 47b when the securing arrangement 32 is in the securing position shown in FIG. 2, the securing arrangement 32 may rotate in the direction opposite to arrow A away from the securing position. However, only a small amount of rotation will occur since the next anti-rotation tab 44 which has not failed, for example adjacent to the failed anti-rotation tab 44, will enter into abutment with the side face 47b and thereby prevent further rotation of the securing arrangement 32. The securing arrangement 32 will accordingly still be in a securing position in which it is capable of securing the actuating lever 20 to the spindle 14 and preventing accidental or unwanted release of the actuating lever 20 from the spindle 14.

When it is desired to intentionally release the actuating lever 20 from the spindle 14, the anti-rotation tabs 44 can be bent upwardly or snapped off the flange portion 34 so that manual rotation of the securing arrangement 32 in the direction opposite to arrow A, away from the securing position, is possible. When the actuating lever 20 is subsequently secured again to the spindle 14, it is envisaged that a new securing arrangement 32 would be used, the previous securing arrangement having been discarded.

In order to prevent the anti-rotation tabs 44, which may present sharp edges, from causing damage to surrounding components in the engine, a circumferentially extending protective cap 50, for example made of a rubber or plastics material, may optionally be located over the securing arrangement 32, as illustrated in FIG. 3.

There is thus provided a securing arrangement 32 for securing an actuating lever 20 to a spindle 14, for example a spindle 14 of a variable inlet guide vane 10 in a gas turbine engine, which prevents accidental and unwanted release of the actuating lever 20 from the spindle 14.

Although embodiments of the invention have been described in the preceding paragraphs with reference to various examples, it should be appreciated that various modifications to the examples given may be made without departing from the scope of the present invention, as claimed. For example, the anti-rotation means 42 may be in a form other than anti-rotation tabs 44. A single anti-rotation tab 44 may be provided. Fastening formations 30, 38 other than threaded formations may be provided. The securing arrangement 32 may be adapted to secure an actuating lever 20 to a spindle 14 in a turbine, or in any other rotating component, of a gas turbine engine Whilst endeavouring in the foregoing specification to draw attention to those features of the invention believed to be of particular importance, it should be understood that the Applicant claims protection in respect of any patentable feature or combination of features hereinbefore referred to and/or shown in the drawings, whether or not particular emphasis has been placed thereon.

We claim:

1. A securing arrangement for securing an actuating lever to a spindle, the securing arrangement comprising a fastening formation rotatably co-operable, in use, with a corresponding fastening formation on the spindle, and being rotatable relative to the spindle and lever to a securing position in which the respective fastening formations co-operate so that the securing arrangement secures the actuating lever to the spindle, wherein the securing arrangement includes anti-rotation means for preventing rotation of the securing arrangement from the securing position wherein said anti-rotation means extends generally radially from said securing arrangement and wherein the anti-rotation means is axially deflectable from the radially extending position to permit rotation of the securing arrangement, in use, relative to the spindle and lever.

2. A securing arrangement according to claim 1, wherein the anti-rotation means is co-operable, in use, with the actuating lever to prevent rotation of the securing arrangement from the securing position.

3. A securing arrangement according to claim 1, wherein the anti-rotation means is arranged to abut a side face of the actuating lever, in use, to prevent rotation of the securing arrangement from the securing position.

4. A securing arrangement according to claim 1, wherein the anti-rotation means extends generally circumferentially around the securing arrangement.

5. A securing arrangement according to claim 1, wherein the anti-rotation means comprises an anti-rotation tab.

6. A securing arrangement according to claim 1, wherein the anti-rotation means comprises a plurality of anti-rotation tabs, each anti-rotation tab extending generally radially from the securing arrangement.

7. A securing arrangement according to claim 6, wherein the plurality of anti-rotation tabs are arranged generally circumferentially around the securing arrangement.

8. A securing arrangement according to claim 6, wherein adjacent anti-rotation tabs are arranged to be generally in abutment with each other.

9. A securing arrangement according to claim 1, wherein the securing arrangement includes a circumferentially extending flange portion, the anti-rotation means being defined by the flange portion.

10. A securing arrangement according to claim 9, wherein the securing arrangement includes a fastening portion extending from the flange portion, the fastening formation being provided on the fastening portion.

11. A securing arrangement according to claim 10, wherein the fastening portion extends from the flange portion generally perpendicular thereto.

12. A securing arrangement according to claim 1, wherein the fastening formation comprises a threaded formation co-operable, in use, with a corresponding threaded formation on the spindle.

13. A securing arrangement according to claim 1, wherein the securing arrangement is adapted to secure an actuating lever to a spindle in a rotary component of a gas turbine engine.

14. A gas turbine engine incorporating a securing arrangement according to claim 1 for securing an actuating lever to a spindle in a rotary component of the gas turbine engine.

\* \* \* \* \*